July 7, 1925.  
D. E. SPEICHER  
1,545,286
COMBINED LOCK AND GAUGE FOR HAND SEED SOWERS
Filed Feb. 25, 1925     2 Sheets-Sheet 1
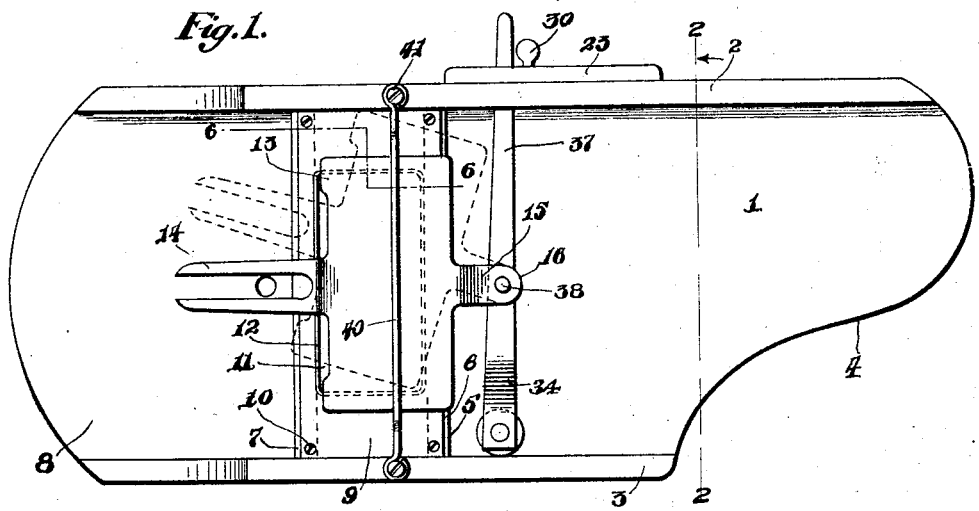
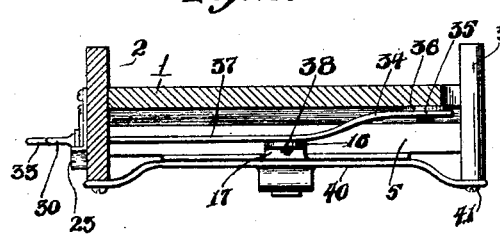
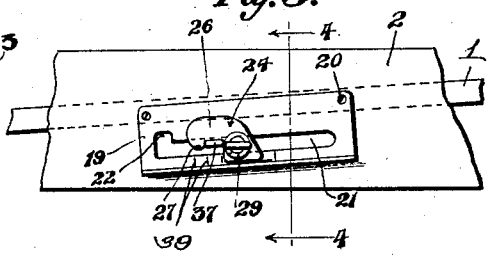
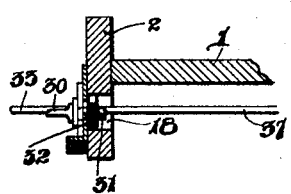
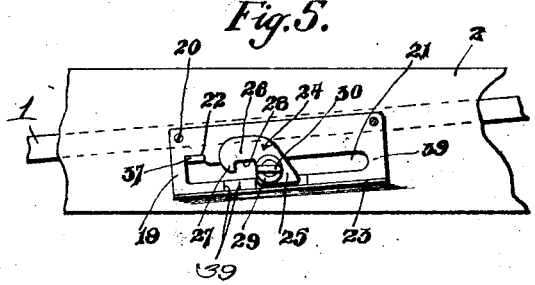
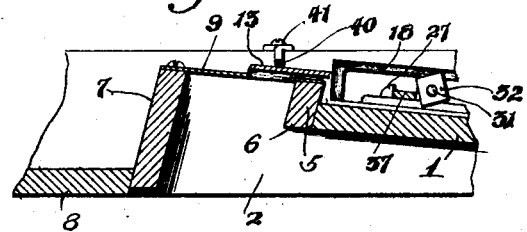
INVENTOR.  
Daniel E. Speicher  
BY  
Geo. S. Kimmel  
ATTORNEY.

Patented July 7, 1925.

1,545,286

UNITED STATES PATENT OFFICE.

DANIEL E. SPEICHER, OF URBANA, INDIANA.

COMBINED LOCK AND GAUGE FOR HAND SEED SOWERS.

Application filed February 25, 1925. Serial No. 11,620.

*To all whom it may concern:*

Be it known that I, DANIEL E. SPEICHER, a citizen of the United States, residing at Urbana, in the county of Wabash and State of Indiana, have invented certain new and useful Improvements in Combined Locks and Gauges for Hand Seed Sowers, of which the following is a specification.

This invention relates to a combined lock and gauge for use in connection with hand operated broad cast seed sowers, and has for its object to provide, in a manner as hereinafter set forth, a new, novel and perfected means for adjustably positioning the feed gate, of a sower of the type referred to, to the desired gauge and further for detachably locking the gate in gauged position to maintain it in the position set during the sowing operation or until manually released.

Further objects of the invention are to provide, in a manner as hereinafter set forth, a combined lock and gauge for the purpose referred to, which is simple in its construction and arrangement, strong, durable, compact, thoroughly efficient and convenient in its use, readily installed with respect to the feed gate of the sower, and comparatively inexpensive to manufacture.

With the foregoing and other objects in view, the invention consists of the novel construction, combination and arrangement of parts as hereinafter more specifically described and illustrated in the accompanying drawings, wherein is shown an embodiment of the invention, but it is to be understood that changes, variations and modifications can be resorted to which fall within the scope of the claims here unto appended.

In the drawings wherein like reference characters denote corresponding parts throughout the several views:—

Figure 1, is an inverted plan of a sower bottom showing the adaptation of the feed gate of the sower with a combined lock and gauge in accordance with this invention.

Figure 2, is a section on line 2—2, Figure 1.

Figure 3, is a fragmentary view, of the sower bottom, in side elevation, and further illustrating in side elevation the combined lock and gauge adjusted and locking the feed gate in gauged position.

Figure 4, is a section on line 4—4, Figure 3.

Figure 5, is a view similar to Figure 3 illustrating a combined lock and gauge maintaining the feed gate in closed position.

Figure 6, is a section on line 6—6, Figure 1.

Figure 7:
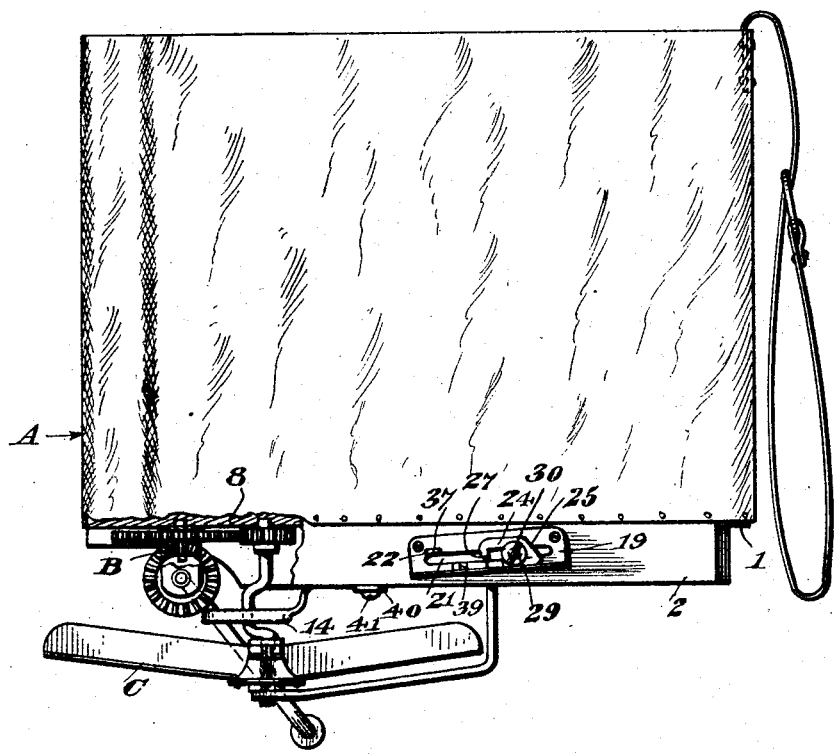
Figure 7 is a side elevation of a hand operated broadcast seed sower, showing the adaptation therewith of a combined lock and gauge in accordance with this invention.
Figure 8:
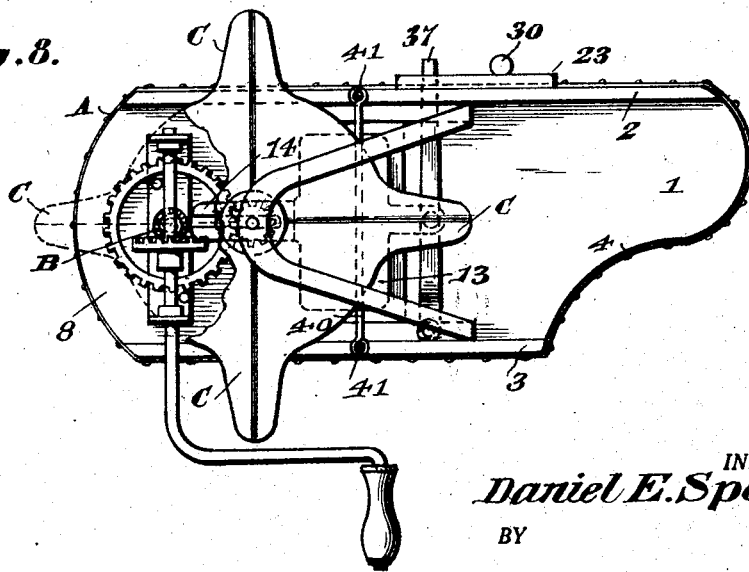
Figure 8 is an inverted plan, partly broken away, of the seed sower showing the adaptation therewith of the lock and gauge.

Referring to the drawings in detail the sower referred to generally by the reference character A, comprises a bottom, as shown, comprises a downwardly inclined plate or board 1, which is arranged between a pair of side members 2, 3, standing on edge. The member 2 is of greater length than the member 3 and the rear end of the member 3 is arranged forwardly of the rear end of the member 2. The plate 1 extends from the rear end of the members 2, 3 to a point intermediate the ends thereof and also projects rearwardly from the rear end of the member 3. The plate 1 is cut away, as at 4, so it can rest against the body of the operator. The plate 1 inclines downwardly throughout and the rear end of the plate is positioned in proximity to the top edge of the member 2 at the rear end thereof. The forward end of the plate 1 abuts against a depending cross bar 5 which has its bottom edge 6 positioned above the bottom edges of the members 2, 3. The bar 5 extends from the member 2 to the member 3 and is suitably connected therewith.

Spaced forwardly of the bar 5 is an inclined strip 7, the inclination of which is forward and the bottom edge of the strip 7 is arranged in alignment with the bottom edge 6 of the cross bar 5. The strip 7 is of greater height than the bar 5 and abutting against the forward side of the strip 7 is a forward plate or board 8. The strip 7 and board 8 are arranged between the members 2 and 3, as well as being suitably secured thereto. The bar 5, in connection with the strip 7, provides in connection with an apertured plate 9, the discharge compartment for the seed. The plate 9 is secured to the lower edges of the bar 6 and strip 7, by the hold fast devices 10 and said plate 9 is formed with a rectangular opening 11 providing a discharge outlet for the compartment formed by the bar 5, strip 7 and plate 9. The opening 11 is surrounded by a ridge 12 forming an integral part of and depending from the lower face of the plate 9. Positioned against the ridge 12 and normally closing the opening 11 is an oscillatory feed gate 13 provided with a pair of forwardly extending spaced arms 14, which are engaged by a manually operated driving mechanism B, for oscillating the gate 13, and the latter is of greater length than the opening 11 and has projecting rearwardly therefrom a lug 15 which is disposed centrally with respect to the rear side of said gate 13. The driving mechanism B also operates the seed wheel C. The rear end of the lug 15, is off set with respect to the lower portion thereof so that the said rear portion, as indicated at 16, will be positioned above the front portion thereof, which is indicated at 17.

The combined lock and gauge, in accordance with this invention, includes the side member 2 of the sower bottom and said member 2 is formed, rearwardly of the rod 5, with an inclined slot 18 and said slot inclines upwardly in a rearward direction from the lower to the top edge of the member 2.

The combined lock and gauge further includes a rectangular plate 19 which is secured, by the holdfast devices 20, to the outer side of the member 2. The plate 19 is disposed at an inclination and formed with a lengthwise slot 21 which registers with the slot 18. The upper wall of the slot 21, at the forward end thereof, is cut away, as at 22, to provide, in connection with the forward end wall of the slot 21, a recess for the purpose to be presently referred to. The plate 19 is formed at its bottom with an outwardly extending longitudinal flange 23 acting as a support for a gauge member 24, which consists of an angle-shaped body formed of two arms 25, 26. The arm 25 is vertically disposed and the arm 26 extends forwardly from the upper end of the arm 25 and at an angle thereto and said arm 26, at its free end, is provided with a lug 27, opposing and spaced from the forward edge of the arm 25 to provide a recess 28 for a purpose to be presently referred to.

The gauge member 24 further includes a locking device which consists of a locking member 29 having its outer end formed with a finger piece 30 and further including an inwardly extending peripherally threaded stem 31 carrying a holding nut. The stem 31 extends through an opening 32 formed in the arm 25 and into the slot 18. The stem 31 is of a length to terminate short of the inner side of the member 2 when the locking member is in place.

The gauge member is shiftable lengthwise of the slot 21 and, after it is shifted to the desired position, is held from movement by the locking device when the locking member thereof is revolved in a clockwise direction to clamp the arm 30, nut 32, and plate 19 together. When the locking member is revolved in an anti-clockwise direction the locking device is released to permit of the gauge member being shifted to the desired position.

Pivotally connected to the lower face of the plate or board 1, in proximity to the member 3, is a resilient adjusting lever for the gate 13. The said lever is generally referred to by the reference character 33 and has its outer portion thereof off set with respect to its inner portion so that the inner portion will be positioned above the outer portion. The inner portion of the lever 33 is indicated at 34, and is mounted upon a pivot 35, which is secured to and depends from the plate 1. Interposed between the plate 1 and the inner end of the lever 33 is a washer 36. The lower portion of the lever 33 is indicated at 37 and which is pivoted, as at 38, to the lug 15. The lever 33 projects through the slots 18 and 21 and when the gate 13 is in closed position, the outer end of the lever 33 is mounted in the recess 22 whereby the gate 13 is maintained in closed position. As the lever 33 is resilient it will spring in said recess 22 and remain in such position.

If it be desired to gauge the plate 13 for the purpose of regulating the discharge through the opening 11, the lever 33 is shifted in a rearward direction, and which carries the plate 13 therewith. Prior to the shifting of the lever 33 to gauge the position of the gate 13, the gauge member 24 is set, by way of example, to the position shown in Figure 3, and after the lever 33 has been shifted to gauge the position of the gate 13, the outer end of the lever 33 is mounted in the recess 28 and the gate will then be maintained in gauged position and held in such position during the oscillation thereof to provide for the sowing of the seed. As the lever 33 is resilient it will spring into the recess 28 and be held in such position until manually released.

The outer face of the plate 19 is provided with a series of gauge graduations as at 39. The gate 13 is held in sliding engagement with respect to the ridge 12 by an up set retaining member 40, which extends transversely of the sower bottom and is secured by the hold fast devices 41 to the side members 2 and 3.

It is thought that the many advantages of a combined gauge and lock, in accordance with this invention, for the feed gate of a hand operated broad cast sower can be readily understood, and although the preferred embodiment is as illustrated and described, yet it is to be understood that changes in the details of construction can be had which will fall within the scope of the invention as claimed.

What I claim is:—

1. A combined gauge and lock for the purpose set forth comprising a pivoted resilient feed gate shifting lever, a slotted plate provided with a recess for the reception of the free end of said lever to lock the gate in closed position and a gauge member slidably connected to said plate and provided with a recess for the reception of the outer end of said lever for locking it in adjusted position to maintain the gate in gauged position, said gauge member including means for locking it in set position.

2. A combined gauge and lock for the purpose set forth comprising a pivoted resilient feed gate shifting lever, a slotted plate provided with a recess for the reception of the free end of said lever to lock the gate in closed position, and a gauge member slidably connected to said plate and provided with a recess for the reception of the outer end of said lever for locking it in adjusted position to maintain the gate in gauged position, said gauge member including means for locking it in set position, and said plate provided with a flange for supporting said gauge member.

3. A combined gauge and lock for the purpose set forth comprising an off set resilient feed gate adjusting lever extending transversely and projecting from one side of the bottom of the sower, means for pivotally connecting the inner end of said lever to the bottom of the sower, means for pivotally connecting the lever intermediate its ends to the feed gate of the sower, a slotted plate adapted to be secured to the side of the bottom of the sower and having said lever extending therethrough, said plate provided with a recess for the reception of the outer end of the lever for adjustably locking the feed gate in closed position, and an adjustable gauge member slidably connected to said plate and provided with a recess for receiving the outer end of said lever for detachably locking it in adjusted position.

4. A combined gauge and lock for the purpose set forth comprising an off set resilient feed gate adjusting lever extending transversely and projecting from one side of the bottom of the sower, means for pivotally connecting the inner end of said lever to the bottom of the sower, means for pivotally connecting the lever intermediate its ends to the feed gate of the sower, a slotted plate adapted to be secured to the side of the bottom of the sower and having said lever extending therethrough, said plate provided with a recess for the reception of the outer end of the lever for adjustably locking the feed gate in closed position, an adjustable gauge member slidably connected to said plate and provided with a recess for receiving the outer end of said lever for detachably locking it in adjusted position, and said guage member including means for detachably locking it in adjusted position.

5. A combined gauge and lock for the purpose set forth comprising an off set resilient feed gate adjusting lever extending transversely and projecting from one side of the bottom of the sower, means for pivotally connecting the inner end of said lever to the bottom of the sower, means for pivotally connecting the lever intermediate its ends to the feed gate of the sower, a slotted plate adapted to be secured to the side of the bottom of the sower and having said lever extending therethrough, said plate provided with a recess for the reception of the outer end of the lever for adjustably locking the feed gate in closed position, an adjustable gauge member slidably connected to said plate and provided with a recess for receiving the outer end of said lever for detachably locking it in adjusted position, said gauge member including means for detachably locking it in adjusted position, and said plate provided with a supporting flange for said gauge member.

In testimony whereof, I hereby affix my signature.

DANIEL E. SPEICHER.